United States Patent
Lotz et al.

(10) Patent No.: US 10,926,765 B2
(45) Date of Patent: Feb. 23, 2021

(54) CRUISE CONTROL INTERLOCK SYSTEM

(71) Applicant: PACCAR Inc, Bellevue, WA (US)

(72) Inventors: Josef Lotz, Corinth, TX (US); Nathan Paul, Kirkland, WA (US); Tristan Pyle, Bothell, WA (US); Bryan Ross, Kirkland, WA (US)

(73) Assignee: PACCAR INC, Bellevue, WA (US)

( * ) Notice: Subject to any disclaimer, the term of this patent is extended or adjusted under 35 U.S.C. 154(b) by 226 days.

(21) Appl. No.: 16/025,472

(22) Filed: Jul. 2, 2018

(65) Prior Publication Data

US 2020/0001869 A1     Jan. 2, 2020

(51) Int. Cl.

| | |
|---|---|
| *B60W 30/14* | (2006.01) |
| *B60K 31/16* | (2006.01) |
| *B60W 50/14* | (2020.01) |
| *B60K 31/00* | (2006.01) |

(52) U.S. Cl.
CPC ........... *B60W 30/146* (2013.01); *B60K 31/16* (2013.01); *B60W 50/14* (2013.01); *B60K 2031/0091* (2013.01); *B60K 2310/00* (2013.01); *B60W 2510/30* (2013.01); *B60W 2555/20* (2020.02)

(58) Field of Classification Search
CPC ....... B60W 2540/10; B60W 2720/106; B60W 10/08; B60W 10/184; B60W 2710/0666; B60W 30/12; B60W 30/143
See application file for complete search history.

(56) References Cited

U.S. PATENT DOCUMENTS

| | | | | |
|---|---|---|---|---|
| 5,646,851 A | * | 7/1997 | O'Connell | B60K 31/047 123/350 |
| 6,009,355 A | * | 12/1999 | Obradovich | B60G 17/0195 701/1 |
| 6,178,371 B1 | * | 1/2001 | Light | B60K 31/04 123/339.12 |

(Continued)

FOREIGN PATENT DOCUMENTS

| | | | |
|---|---|---|---|
| GB | 2523465 A | | 8/2015 |
| GB | G0 2523465 | * | 8/2015 |
| WO | WO-2011076226 A1 | * | 6/2011 ......... F16H 61/0213 |

OTHER PUBLICATIONS

International Search Report and Written Opinion dated Mar. 28, 2019, issued in corresponding International Application No. PCT/US2018/040618, filed Jul. 2, 2018, 8 pages.

(Continued)

*Primary Examiner* — Redhwan K Mawari

(57) ABSTRACT

A cruise control interlock system detects a current set of conditions for a vehicle, compares the current conditions with cruise control interlock conditions (e.g., an adjustable threshold state of a windshield wiper system), and executes a process to deactivate the cruise control system. The process to deactivate functionality of the cruise control system may include presenting a notification to the operator to alert the operator to an upcoming automatic deactivation or to encourage the operator to deactivate cruise control. The process also may include a vehicle de-rate process (e.g., reducing vehicle speed) to induce the operator to deactivate cruise control. Deactivation of cruise control may be postponed in some situations, such as when the vehicle is ascending an uphill grade or where doing so may deactivate an active downhill speed control function.

11 Claims, 6 Drawing Sheets

(56) References Cited

U.S. PATENT DOCUMENTS

| | | | | |
|---|---|---|---|---|
| 7,706,953 | B1* | 4/2010 | Sun | B60K 31/042 |
| | | | | 123/399 |
| 2008/0306669 | A1* | 12/2008 | Wang | B60K 31/00 |
| | | | | 701/93 |
| 2009/0138168 | A1* | 5/2009 | Labuhn | B60W 10/10 |
| | | | | 701/93 |
| 2010/0102972 | A1* | 4/2010 | Middlekauff | B60K 28/066 |
| | | | | 340/576 |
| 2011/0160964 | A1 | 6/2011 | Obradovich | |
| 2013/0054063 | A1* | 2/2013 | Maier | B60K 6/442 |
| | | | | 701/22 |
| 2014/0156163 | A1* | 6/2014 | Shin | B60W 10/184 |
| | | | | 701/94 |
| 2014/0309885 | A1 | 10/2014 | Ricci | |
| 2015/0057117 | A1* | 2/2015 | Antchak | F16H 7/12 |
| | | | | 474/109 |
| 2015/0109146 | A1* | 4/2015 | Drobot | G08G 1/0112 |
| | | | | 340/905 |
| 2015/0151714 | A1* | 6/2015 | Kamiya | B60R 16/02 |
| | | | | 701/49 |
| 2017/0261974 | A1* | 9/2017 | Ebe | B60W 30/14 |
| 2018/0245560 | A1* | 8/2018 | Pochner | F02N 11/0837 |
| 2018/0268695 | A1* | 9/2018 | Agnew | B60K 28/066 |
| 2018/0269954 | A1* | 9/2018 | Raghavan | H04B 7/0695 |
| 2019/0023304 | A1* | 1/2019 | Radabaugh | B60W 10/20 |
| 2019/0381865 | A1* | 12/2019 | Oshikiri | B60H 1/00735 |
| 2020/0001869 | A1* | 1/2020 | Lotz | B60W 30/146 |

OTHER PUBLICATIONS

"2017 Infiniti QX50: Owner's Manual and Maintenance Information," Infiniti, pages from Chapter 5: Starting and driving, 3 pages.

"Freightliner Cascadia Driver's Manual," Document No. STI-478-3, Chapter 10: Optional Engine Systems, Nov. 2010, Daimler Trucks North America LLC, Portland, Oregon, 10 pages.

"Rain-Sensing Wipers," Toyota Canada, <https://www.toyota.ca/toyota/en/connect/1893/rain-sensing-wipers-rav4-highlander-sienna> [retrieved Jun. 25, 2018], 2 pages.

* cited by examiner

CRUISE CONTROL INTERLOCK SYSTEM

BACKGROUND

Cruise control systems for vehicles can provide significant benefits in terms of operator convenience and fuel economy gains, especially for line-haul trucks. However, there are some situations in which cruise control may be undesirable or even unsafe. For example, inclement weather conditions such as rain or sleet may be unsafe for cruise control. Although some vehicles will disable cruise control in some situations, prior systems have not provided adjustable settings or sufficient notifications, resulting in confusion on the part of the operator and an inability of the owner or fleet operator to adjust to different use cases or driver preferences, thereby degrading the experience of the operator and the performance of the vehicle. In addition, prior systems have not accounted for situations in which deactivation of cruise control may cause undesirable effects that outweigh the potential benefits of canceling cruise control.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In an embodiment, a cruise control interlock system detects a current set of conditions for a vehicle. The system compares the current set of conditions with cruise control interlock conditions and executes a process to encourage the operator to deactivate the cruise control system. The conditions being compared may include one or more states of vehicle systems or features, such as a windshield wiper system, a seatbelt sensor, a headlamp switch, a tire pressure monitoring system, a stop engine lamp, or system air pressure. The process may include presenting a notification via an operator interface and initiating a vehicle de-rate process. The vehicle de-rate process may include reducing speed of the vehicle, e.g., by periodically reducing vehicle speed by a predetermined amount. In some situations, the driver inducement process may include deactivating or partially deactivating cruise control functionality, e.g., by disabling the ability to increment cruise control set speed.

In another embodiment, deactivation of cruise control is postponed to avoid deactivating an active downhill speed control function. This postponement helps to ensure that the operator will not lose control of the vehicle when descending a hill. The cruise control interlock system receives a first signal indicating a current state of the vehicle, a second signal indicating that the cruise control system is active, and a third signal indicating that a downhill speed control system is active. The system compares the current state with a threshold state. The threshold state and the current state of the vehicle may correspond to a windshield wiper system state, or some other state or combination of states. The system deactivates the cruise control system based at least in part on the comparison. The step of deactivating the cruise control system is postponed at least until the downhill speed control system is no longer active. Preferably, the system provides a notification to the operator via the operator interface in order to alert the driver that the cruise control system has been or will be deactivated.

In another embodiment, an inclement driving condition function is activated based on the state of the windshield wiper system to help ensure that cruise control is inactive during inclement driving conditions, or that use of cruise control in such conditions is minimized. The cruise control interlock system obtains one or more adjustable cruise control deactivation settings for the vehicle, including a threshold state of the windshield wiper system. Other possible settings include misuse prevention parameters, time delay periods, and hysteresis time periods. These settings, including the threshold state, may be selected and subsequently adjusted by, e.g., the vehicle owner or fleet operator to account for factors such as operator preferences or prevailing driving conditions in a particular operation scenario or geographic area. The cruise control interlock system receives a signal indicating a current state of the windshield wiper system and compares the current state with the threshold state. In an embodiment, the available states from which the threshold state and the current state are selected include an inactive state, one or more intermittent states, a low speed state, and a high speed state. The cruise control interlock system activates an inclement driving condition interlock based at least in part on the comparison. If cruise control is active, the cruise control interlock system initiates a process to deactivate functionality of the cruise control system (e.g., by canceling cruise control or disabling the ability of the operator to increment cruise control set speed) while the inclement driving condition interlock is active. This process may include postponing deactivation of the cruise control system until after expiration of a time delay period, which can help to avoid unnecessarily canceling cruise control where the wiper system is activated briefly, e.g., to clear debris from the windshield. This process also may include presenting a notification to the operator. This process also may include a vehicle de-rate process, such as reducing vehicle speed at a predetermined rate while the inclement driving condition function remains active. Where a downhill speed control function is active, this process also may include postponing deactivation of the cruise control system at least until the downhill speed control function is no longer active. If cruise control is inactive, the cruise control interlock system disables cruise control functionality while the inclement driving condition interlock is active.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
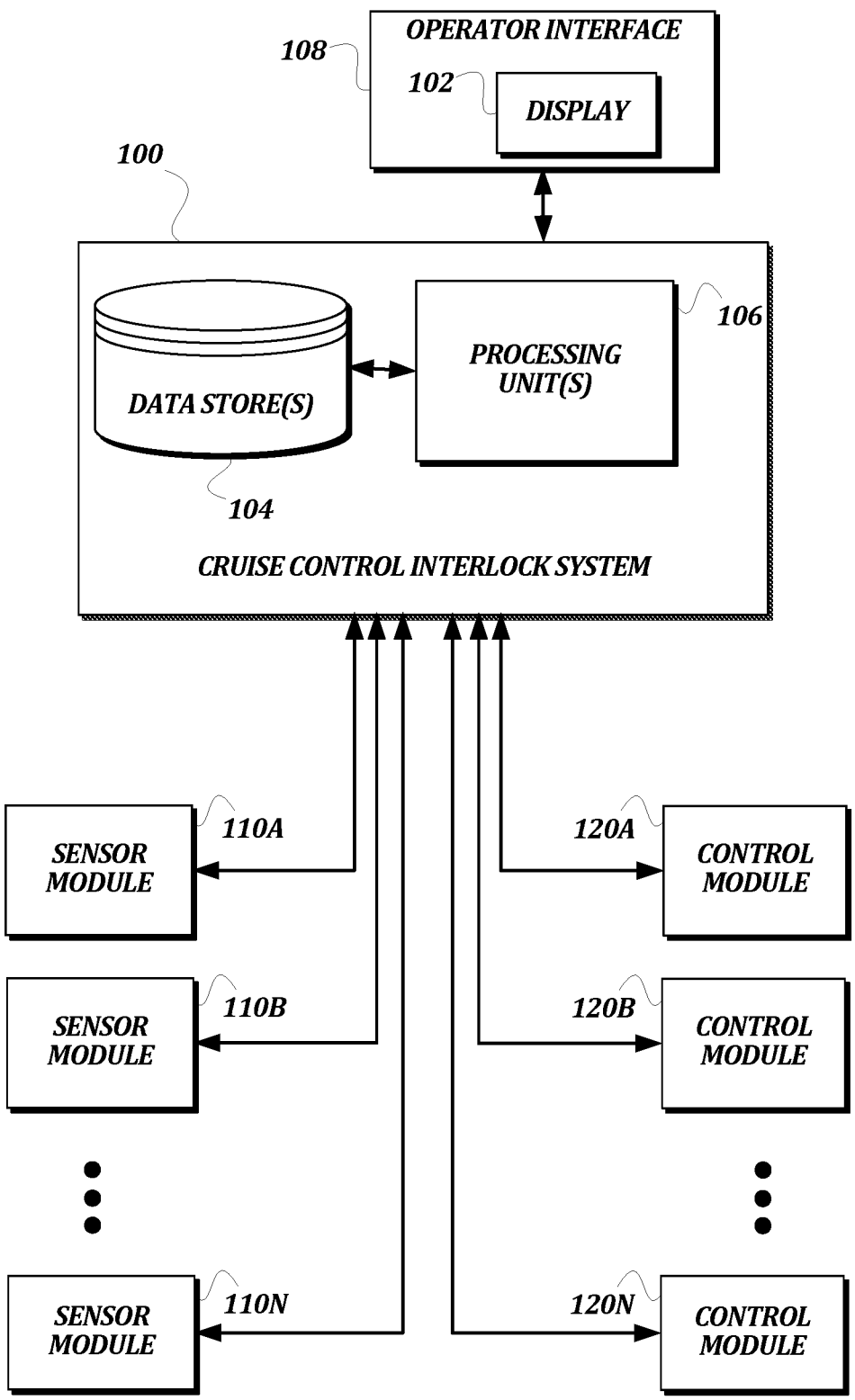
FIG. 1 is a system diagram that illustrates an embodiment of a vehicle computer system including a cruise control interlock system according to various aspects of the present disclosure.

The detailed description set forth below in connection with the appended drawings is an illustrative and nonlimiting description of various embodiments of the disclosed subject matter. The following description proceeds with reference to examples of systems and methods suitable for use in vehicles, such as Class 8 trucks. Although illustrative embodiments of the present disclosure will be described hereinafter with reference to trucks, it will be appreciated that aspects of the present disclosure have wide application, and therefore, may be suitable for use with many types of vehicles, such as passenger vehicles, buses, commercial vehicles, light and medium duty vehicles, etc.

In described embodiments, a cruise control interlock system detects a current set of conditions for a vehicle (e.g., a heavy-duty truck), compares the current conditions with cruise control interlock conditions (e.g., an adjustable threshold state of a windshield wiper system), and executes a process to deactivate the cruise control system. The process to deactivate functionality of the cruise control system may include presenting a notification to the operator to alert the operator to an upcoming automatic deactivation or to encourage the operator to deactivate cruise control. In an embodiment, in order to improve safety in inclement driving conditions, such as rain or snow, a vehicle computer system provides a cruise control interlock function with adjustable settings to disable or deactivate (or encourage the operator to deactivate) cruise control functionality when the windshield wiper system of the vehicle is detected to be in an active state. The adjustable nature of these settings allows vehicle owners or fleet operators to respond to driver preferences or the needs of particular use cases and avoid unnecessary interference with cruise control functionality, while also limiting time spent with cruise control active in situations where cruise control may be unsafe or undesirable.

Notifications provide users with feedback to avoid confusion as to why cruise control functionality may not be available, to allow time for operators to resolve the issues that are causing the interlock condition to be active, or to prepare for deactivation of cruise control if the interlock condition cannot be immediately resolved. In a situation where immediate deactivation of cruise control may not be desirable, the vehicle computer system may provide an adjustable time delay before cruise control is deactivated. In a situation where automatic deactivation of cruise control may not be desirable, the vehicle computer system may provide a notification and/or inducements (e.g., progressive vehicle de-rates) to request and encourage the operator to manually deactivate cruise control. In an embodiment, the vehicle computer system provides functionality to prevent operator override or circumvention of the interlock system, such as by detecting repeated temporary manual activation of windshield wipers to avoid deactivating cruise control.

Embodiments described herein provide advantages over prior systems. For example, prior systems have not provided adjustable settings or notifications cruise control interlocks, resulting in confusion on the part of the operator and an inability of the owner or fleet operator to adjust to different use cases or driver preferences, thereby degrading the experience of the operator and the performance of the vehicle. In addition, prior systems have not accounted for situations in which deactivation of cruise control may cause undesirable effects, such as deactivating an engine retarder system in a downhill speed control function that is dependent on cruise control being active, or reducing vehicle speed to an undesirable level on an uphill grade.

It should be understood that various embodiments of the present disclosure include logic and operations performed by electronic components. These electronic components, which may be grouped in a single location or distributed over a wide area, generally include processors, memory, storage devices, display devices, input devices, etc. It will be appreciated by one skilled in the art that the logic described herein may be implemented in a variety of hardware, software, and combination hardware/software configurations, including but not limited to, analog circuitry, digital circuitry, processing units, and the like. In circumstances where the components are distributed, the components are accessible to each other via communication links. Components described herein may be communicatively coupled by any suitable means. In one embodiment, components are connected by an internal communications network such as a vehicle bus that uses a controller area network (CAN) protocol, a local interconnect network (LIN) protocol, and/or the like. Those of ordinary skill in the art will recognize that the vehicle bus may be implemented using any number of different communication protocols such as, but not limited to, Society of Automotive Engineers (SAE) J1587, SAE J1922, SAE J1939, SAE J1708, and combinations thereof. In other embodiments, components may be connected by other networking protocols, such as Ethernet, Bluetooth, TCP/IP, and/or the like. In still other embodiments, components may be directly connected to each other without the use of a vehicle bus, such as by direct wired connections between the components. Embodiments of the present disclosure may be implemented using other types of currently existing or yet-to-be-developed communication systems without departing from the scope of the claimed subject matter.

FIG. 1 is a system diagram that illustrates one embodiment of a vehicle computer system including a cruise control interlock system 100 according to various aspects of the present disclosure. In the example shown in FIG. 1, the system 100 includes one or more processing units 106 (e.g., electronic control units (ECUs)) that analyze vehicle conditions, control cruise control functionality, and generate operator notifications. The system 100 communicates with an operator interface 108 comprising a display 102. The display 102 may be any type of display (e.g., an LCD display) used in a vehicle to convey information, such as cruise control interlock notifications or other information related to the operator, the vehicle, or its environment. The operator display 102 may include special purpose lighted displays, needle gauges, and/or the like. The operator interface 108 also may include other output devices such as speakers or haptic feedback devices to provide information to the operator. In a touchscreen configuration, the operator display 102 may have input capabilities. The operator interface 108 also may include other input devices including buttons, toggles, keyboards, mechanical levers, and any other devices that allow an operator to provide input to the system 100 or other systems of the vehicle.

It will be appreciated that the processing units 106 can be implemented in a variety of hardware, software, and combination hardware/software configurations, for carrying out aspects of the present disclosure. The processing units 106 may include memory and a processor. In one embodiment, the memory comprises a random access memory ("RAM") and an electronically erasable, programmable, read-only memory ("EEPROM") or other non-volatile memory (e.g., flash memory) or persistent storage. The RAM may be a volatile form of memory for storing program instructions that are accessible by the processor. The processor is configured to operate in accordance with program instructions. The memory may include program modules, applications, instructions, and/or the like that are executable by the processor. The memory may include program instructions that implement functionality of the system 100. Alternatively, such instructions may be stored in other storage or in other locations.

The processing units 106 are communicatively coupled to one or more data stores 104, which may include data such as vehicle operation data and system configuration data, such as adjustable cruise control deactivation settings. The data store 104 includes a computer-readable storage medium. The data is used by the system 100, as described herein, to perform one or more of the functions described herein. For example, the description makes reference to vehicle data that can be sensed and stored during vehicle operation, as well as programmable settings that can be programmed by the vehicle manufacturer, the owner, the operator, or any other suitable entity. Any suitable computer-readable media, including non-transitory storage media such as an EEPROM, flash memory, hard disk, or the like, may be used to store executable instructions to implement systems and methods described herein.

In the example shown in FIG. 1, the system 100 is communicatively coupled to a plurality of sensors 110A-110N that provide information concerning the status of the vehicle. For example, the system 100 may be communicatively coupled to a vehicle speed sensor module, an engine speed sensor module, a rain-sensing wiper module, or other sensor modules. The sensor modules described herein are only examples, and the present disclosure is not limited the specific sensor modules described herein.

The system 100 is also communicatively coupled to a plurality of vehicle performance control modules 120A-120N for controlling various functions of the vehicle. For example, the system 100 may be communicatively coupled to modules that electronically control vehicle speed, engine speed, or other more specialized functions such as cruise control, downhill speed control, windshield wiper function, and the like. The vehicle performance control modules described herein are only examples, and the present disclosure is not limited to the specific vehicle performance control modules described herein.

The system 100 may be implemented in an on-board vehicle computer system or in some other configuration. Although some examples described herein relate to on-board vehicle computer systems, such examples may be extended to involve computer systems that are not on board a vehicle. For example, a suitably equipped vehicle may communicate with other computer systems wirelessly, e.g., via a WiFi or cellular network. Such systems may provide remote data processing and storage services, remote diagnostics services, driver training or assistance, or other services. In such an embodiment, the system 100 may be implemented in one or more computing devices that communicate with but are separate from, and potentially at a great distance from the vehicle.

Illustrative Cruise Control Interlock Systems

This section describes illustrative embodiments of a cruise control interlock system 100 that may be implemented in the on-board vehicle computing system of FIG. 1 or in some other computing system. Although illustrative details are provided in this section, it should be understood that alternative systems and methods can be implemented and used in accordance with the present disclosure.

Figure 2:
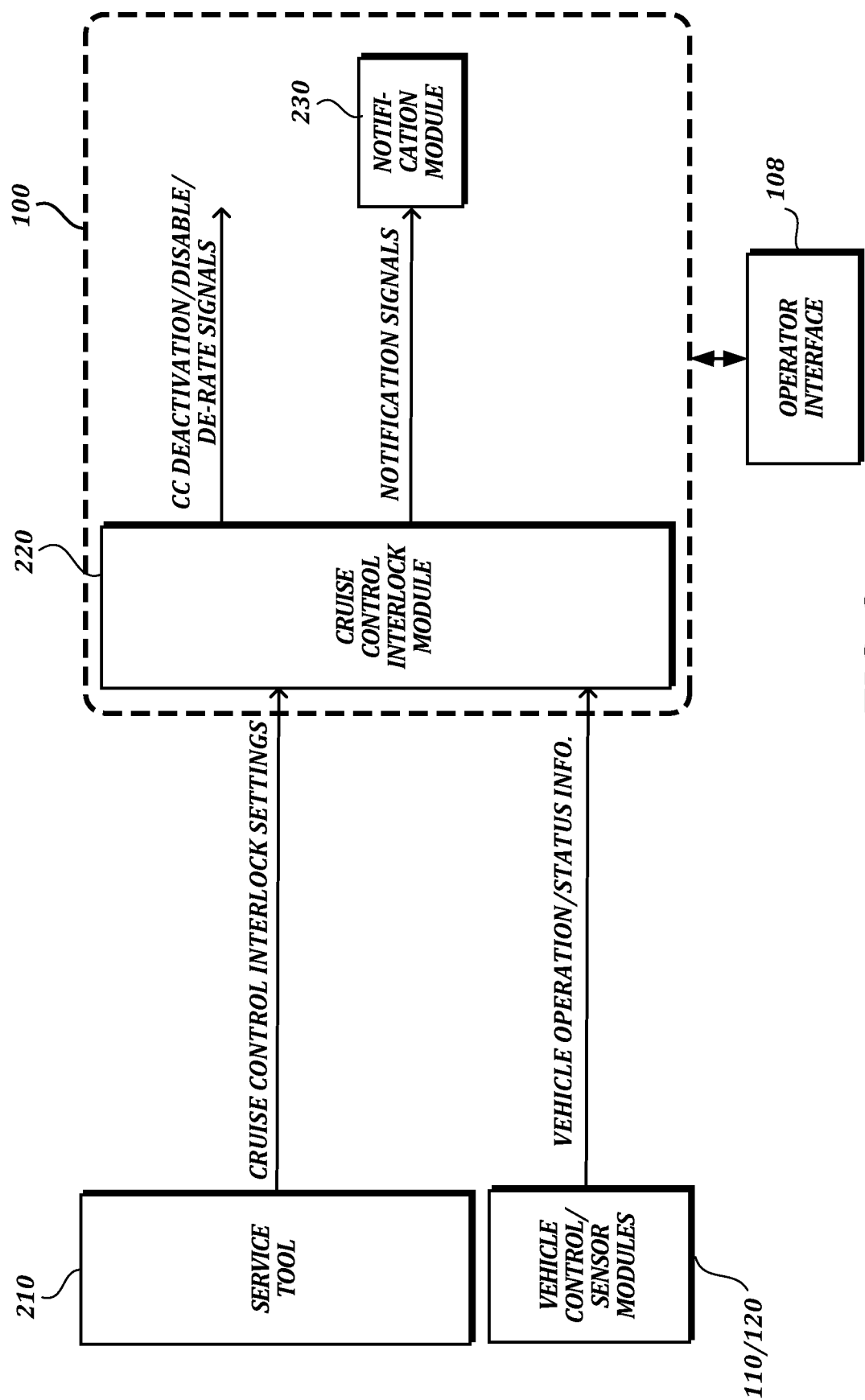
FIG. 2 is a system diagram that illustrates another embodiment of a vehicle computer system including a cruise control interlock system according to various aspects of the present disclosure.

FIG. 2 is a diagram of an embodiment of a cruise control interlock system. In the example shown in FIG. 2, the system 100 includes a cruise control interlock module 220 and a notification module 230. The cruise control interlock module 220 and notification module 230 may be implemented in one or more ECUs or other processing units. The system 100 receives signals that provide system configuration information in the form of cruise control interlock settings and vehicle operation and status information. In this example, the system configuration information is received from a service tool 210, and the vehicle operation and status information is received from vehicle control modules 120 and/or vehicle sensor modules 110. The service tool 210 may connect to an on-board vehicle computer system via the CAN bus. Alternatively, system configuration information can be provided in some other way or by some other device, such as a remote computer communicating wirelessly with the system 100. Vehicle operation information, status information, and system configuration information may be stored in one or more data stores, such as data stores within the DPA module 220 or elsewhere within or outside of the system 100.

System configuration information provided to the system 100 may include signals that indicate whether cruise control interlock functionality is enabled. Such information also may include, e.g., threshold interlock states (e.g., windshield wiper activation levels), time delay periods, notification settings, and the like. Vehicle operation and status information provided to the system 100 may include various types of information that may be relevant to deciding whether cruise control should be active or not, such as windshield wiper status, seatbelt status (e.g., indicating operator's seatbelt is not buckled at a threshold vehicle speed), headlamp switch status (e.g., indicating headlamp switch is off at a threshold vehicle speed), tire pressure information (e.g., indicating low tire pressure), stop engine lamp status (e.g., indicating a major engine fault), system air pressure information (e.g., indicating low air pressure), and the like. This information may be provided by vehicle control sensors, vehicle sensor modules, data stores, or other sources or combinations of sources. Illustrative signals that may be received by the system 100 (e.g., by the cruise control interlock module 220) are described in further detail with reference to FIG. 3, below.

The system 100 also generates signals. In the example shown in FIG. 2, the cruise control interlock module 220 provides notification signals to the notification module 230. Illustrative signals generated by the system 100 may include signals that indicate whether notifications are to be presented via the operator interface 108 to induce operator behavior relating to cruise control or to warn an operator of an upcoming event, such as a vehicle de-rate or automatic deactivation of cruise control. The cruise control interlock module 220 also generates signals such as cruise control deactivation/disable signals, de-rate signals, and the like. These signals can be provided, for example, as control signals to the cruise control system. Illustrative signals that may be generated by the system 100 (e.g., by the cruise control interlock module) are described in further detail with reference to FIG. 3, below.

Figure 3:
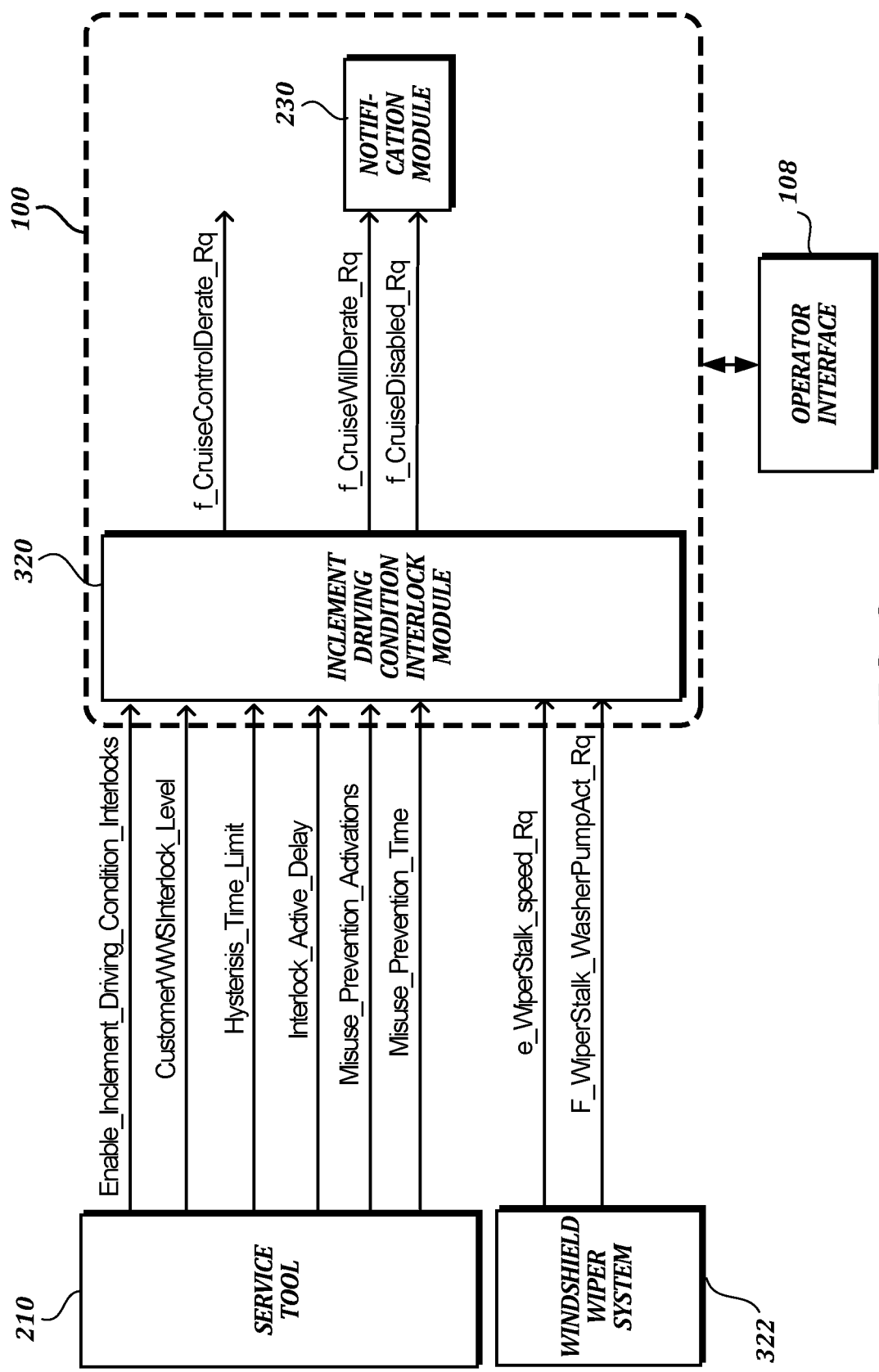
FIG. 3 is a system diagram that illustrates another embodiment of a vehicle computer system including a cruise control interlock system according to various aspects of the present disclosure.

FIG. 3 is a diagram of another embodiment of a cruise control interlock system. In the example shown in FIG. 3, the cruise control interlock module is provided in the form of an inclement driving condition interlock (IDCI) module 320. In this example, the system configuration information includes signals that indicate whether the IDCI module has been activated (e.g., by a vehicle owner), a threshold windshield wiper interlock level, a hysteresis time limit, a time delay period, and misuse prevention parameters. The vehicle operation or status information includes a wiper stalk speed (e.g., intermittent, low, high, etc.) and a washer pump signal.

Illustrative signals received as input in the IDCI module 320 are described in further detail in Tables 1 and 2, below.

TABLE 1

Illustrative system configuration signals.

| Signal | Unit/Type | Description |
|---|---|---|
| Enable Inclement Driving Condition Interlocks | Boolean | Customer programmable parameter to enable the interlocks function. |
| CustomerWWSInterlock Level | integer | Customer-programmable parameter that indicates at what level of wiper activation will be the lowest setting to activate the interlock, e.g., in the range of 0-6 corresponding to the 7 windshield wiper states enumerated in Table 2. |
| HysteresisTimeLimit | seconds | Time limit before the InterlockActive Delay timer will reset. |
| InterlockActive Delay | seconds | Calibratable time delay before activating the IDCI. |
| Misuse Prevention Activations | integer | A parameter to specify the number of wiper or washer activations counted prior to activating IDCI. |
| Misuse Prevention Time | seconds | The monitoring time period in which Misuse Prevention Activations will be counted. |

TABLE 2

Illustrative vehicle status signals.

| Signal | Unit/Type | Description |
|---|---|---|
| e_WiperStalk_speed_Rq | Enumerated | Signal that determines windshield wiper state. Assigns numeric value to windshield wiper states such as the following: [0: OFF, 1: INT1, 2: INT2, 3: INT3, 4: INT4, 5: LOW, 6: HIGH], where: OFF = wipers inactive; INT1 = active, 20 sec periodic delay; INT2 = active, 12 sec periodic delay; INT3 = active, 8 sec periodic delay; INT4 = active, 4 sec periodic delay; LOW = active on low speed with no periodic delay; HIGH = active on high speed with no periodic delay. |
| f_WiperStalk_WasherPumpAct_Rq | Boolean | Indicative of driver request to activate the windshield washer pump. |

In the example shown in FIG. 3, IDCI module 320 provides output signals to the notification module 230. Illustrative signals that may be generated by the IDCI module 320 are described in further detail in Table 3, below.

TABLE 3

Illustrative signals generated by IDCI module.

| Signal | Unit/Type | Description |
|---|---|---|
| f_CruiseControlDerate_Rq | Boolean | Flag indicating whether the Enable Inclement Driving Condition Interlock request is enabled. |
| f_CruiseWillDerate_Rq | Boolean | Flag for popup display notifying driver that cruise control will begin to de-rate or deactivate. |
| f_CruiseDisabled_Rq | Boolean | Flag for telltale display notifying driver that cruise control is not available. |

In an embodiment, the IDCI may be active in several circumstances. For example, the IDCI is active when the following conditions are met:
 1. Enable Inclement Driving Condition Interlock=TRUE; and
 2. Windshield Wiper State≥CustomerWWSInterlock Level Conversely, the IDCI can be deactivated when the Windshield Wiper State value is less than the threshold (CustomerWWSInterlock Level), or when Enable Inclement Driving Condition Interlock=FALSE. The deactivation of the IDCI also may involve waiting until after the time period designated by HysteresisTimeLimit has elapsed as a "cooling off" period. This can be helpful to prevent the driver from immediately resuming cruise control with the wipers still active.

In an embodiment, IDCI is not activated if an operator briefly activates the windshield wipers or washer, e.g., to remove debris. However, an operator may attempt to circumvent the IDCI functionality by repeatedly performing this action. Therefore, to address potential driver misuse, in such an embodiment the IDCI is active when the following conditions are met:
 1. Enable Inclement Driving Condition Interlock=TRUE; and
 2. The windshield wiper system or washer system (e.g., washer pump) has a specified number of Misuse Prevention Activations within the specified Misuse Prevention Time.

Conversely, the IDCI can be deactivated when the windshield wiper or washer system has not had the specified number of Misuse Prevention Activations within the specified Misuse Prevention Time, or when Enable Inclement Driving Condition Interlock=FALSE. This allows the system to prevent an operator from circumventing the interlock function by repeatedly turning on and off the wipers or washer pump.

There also may be other conditions in which the IDCI may not be active. For example, if power take off (PTO), downhill speed control (DSC), adaptive cruise control, or some other function that depends on cruise control is active, the system may set the IDCI as inactive to prevent the windshield wiper state from affecting these functions. When DSC is active, an engine retarder will automatically engage to reduce or maintain vehicle speed, e.g., when vehicle speed is above the cruise control set speed, possibly including an offset. Thus, canceling cruise control may cause the vehicle to unexpectedly gain speed in this situation, which may lead to a loss of control. As another example, IDCI may not be active is the vehicle is ascending an uphill grade. This can help to avoid decreasing speed to an unacceptable level, which may cause the operator to miss gear shifts and struggle to maintain sufficient speed when ascending a hill. The system also may deactivate the IDCI in situations where cruise control may already be disabled, such as when the parking brake is set.

Other sets of conditions for activating or deactivating the IDCI also can be used.

The system may then take action based on whether the IDCI is active or inactive. At a basic level, an active IDCI state will prevent cruise control from being activated or reactivated. For example, cruise control may be canceled, functionality may be reduced (e.g., by preventing setting, resuming, or increasing a cruise control set speed) or a vehicle speed de-rate may be applied, if the following conditions are met:
1. IDCI is active; and
2. Cruise control is active; and
3. The time period specified by InterlockActiveDelay has elapsed.

InterlockActiveDelay may begin counting down when IDCI and cruise control are detected to both be active. This allows time for the operator to adjust rather than immediately deactivating cruise control or slowing the vehicle with a vehicle speed de-rate (e.g., by reducing vehicle speed by 5 mph every 30 seconds, or some other rate of reduction). This time period helps to prevent situations such as slowing the vehicle down too much when going uphill or canceling adaptive cruise control when the driver is not expecting it. The time period may reset when IDCI is no longer active. The reset of the time period also may involve waiting until after the time period designated by HysteresisTimeLimit has elapsed as a "cooling off" period. This can be helpful to prevent the driver from circumventing the interlock function from turning of the wipers to deactivate the IDCI and then immediately turning them on again.

In an embodiment, a cruise control interlock notification is generated when IDCI is active. For example, if IDCI is active and cruise control is active, the notification may instruct or encourage the driver to deactivate cruise control or alert the driver of a pending vehicle de-rate. As another example, if IDCI is active and cruise control is not active, the notification may alert the driver that cruise control cannot currently be activated. Referring again to FIG. 3, when IDCI is active the IDCI module 320 may generate and transmit a signal such as f_CruiseWillDerate_Rq or f_CruiseDisabled_Rq to the notification module 230 to initiate generation of an appropriate notification (e.g., for display at the operator interface 108).

Notifications may take the form of visual cues such as diagrams, text, icons, and the like to communicate truck status, suggested actions, and other information. In any of the examples described herein, the content, appearance, or presence of notifications or other features of an operator interface may depend on operator or owner preferences, system settings, or other factors. Visual and functional elements may include any elements that are suitable for communicating the information described in these examples, or other information that may be relevant to the techniques and systems described herein. Further, the elements described in the following examples can be presented in different ways (e.g., in different colors, sizes, or display locations; animated or static; flashing or not flashing; flashing at different rates; with or without sound; movable on a screen or in a fixed location; etc.). Depending on implementation, one or more visual elements may be activated (e.g., by touch in a touch-enabled interface) to access additional information or functionality. Notifications may be displayed for a defined period of time or until a particular event occurs. As an example, a cruise control interlock notification may be displayed for a defined period of time (e.g., a few seconds) or until IDCI is no longer active.

Illustrative Methods

In this section, illustrative cruise control interlock methods are described that may be performed by an embodiment of the cruise control interlock system 100 described above or by some other system, in accordance with aspects of the present disclosure. Although illustrative details are provided in this section, it should be understood that alternative methods can be implemented and used in accordance with the present disclosure.

Figure 4:
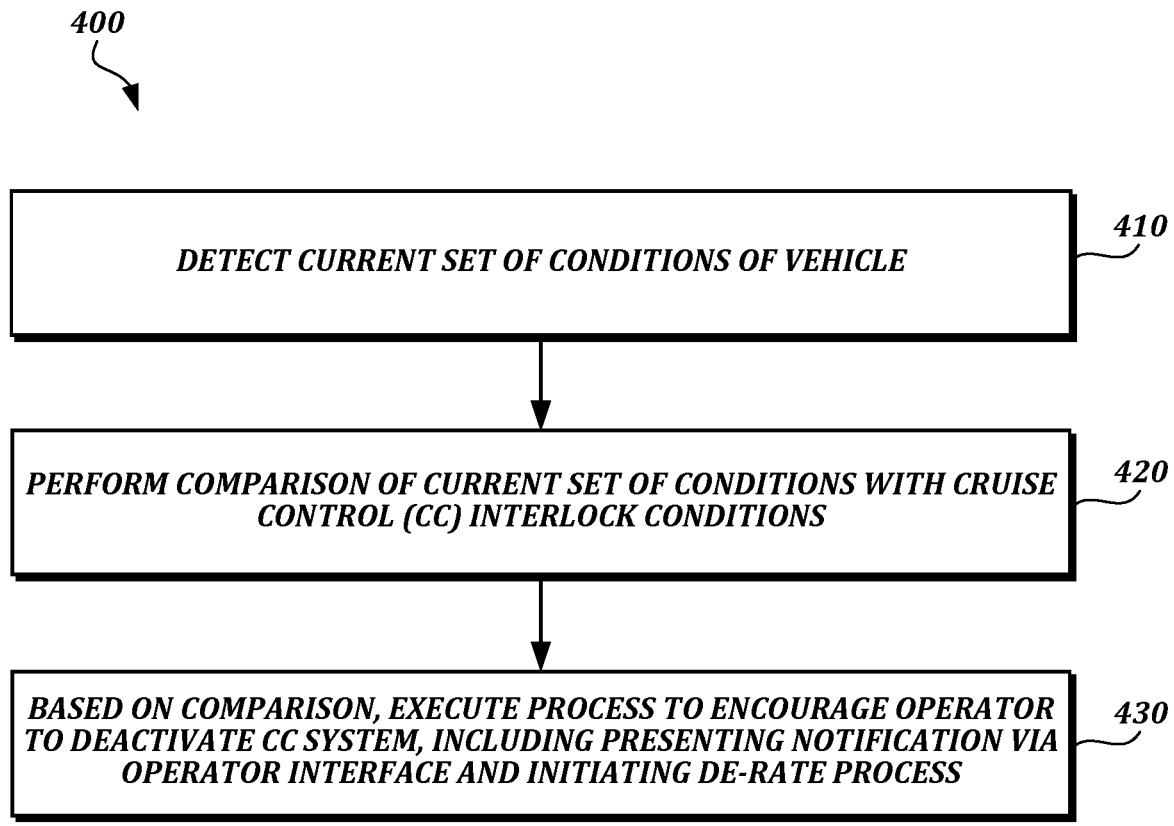
FIGS. 4, 5 and 6 are flow diagrams of illustrative cruise control interlock methods according to various aspects of the present disclosure.

FIG. 4 is a flow diagram of an illustrative cruise control interlock method 400. In this example, a driver inducement process is linked to one or more sets of vehicle conditions in which cruise control may not be desirable. At step 410, the cruise control interlock system detects a current set of conditions for a vehicle. The current set of conditions may include one or more states of vehicle systems or features, such as a windshield wiper system state, a seatbelt state, a headlamp switch state, a tire pressure monitoring system state, a stop engine lamp state, a system air pressure state, or some other state or combination of states. At step 420, the system performs a comparison of the current set of conditions with cruise control interlock conditions, and at step 430 the system executes a driver inducement process to encourage the operator to deactivate the cruise control system. This process includes, in this example, presenting a notification via an operator interface and initiating a vehicle de-rate process. The vehicle de-rate process may include reducing speed of the vehicle, e.g., by periodically reducing vehicle speed by a predetermined amount. In some situations, the driver inducement process may include deactivating or partially deactivating cruise control functionality, e.g., by disabling speed increment functionality.

Figure 5:
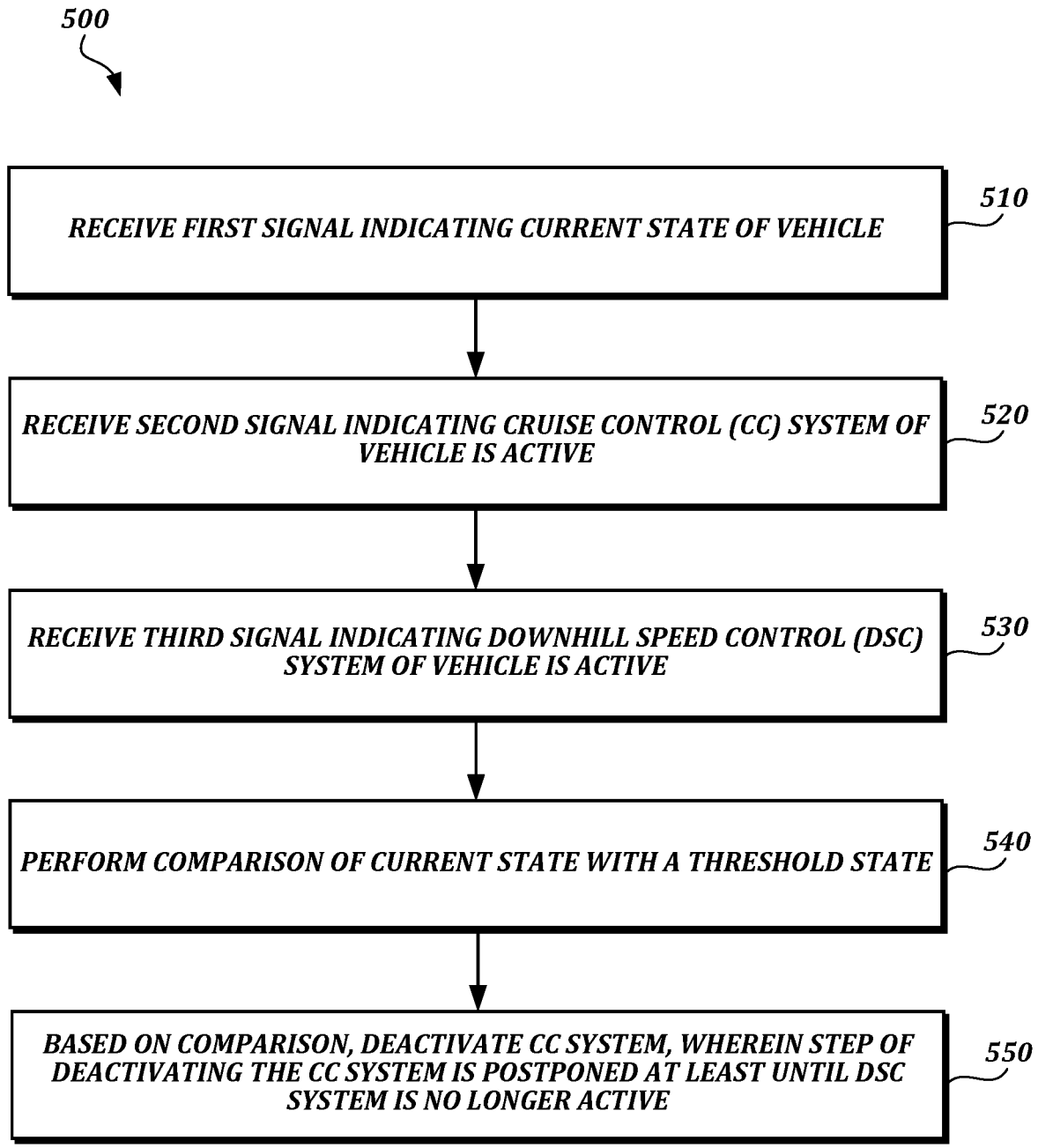

FIG. 5 is a flow diagram of another illustrative cruise control interlock method 500. In this example, deactivation of cruise control is postponed where doing so may deactivate an active downhill speed control function. This postponement helps to ensure that the operator will not lose control of the vehicle when descending a hill. At step 510, the system receives a first signal indicating a current state of the vehicle. At step 520, the system receives a second signal indicating that the cruise control system is active. At step 530, the system receives a third signal indicating that a downhill speed control system is active. At step 540, the system performs a comparison of the current state with a threshold state. In an embodiment, the threshold state and the current state of the vehicle each correspond to a windshield wiper system state. However, the threshold state and the current state also may correspond to other vehicle states, such as a seatbelt state, a headlamp switch state, a tire pressure monitoring system state, a stop engine lamp state, a system air pressure state, or some other state or combination of states. At step 550, the system deactivates the cruise control system based at least in part on the comparison. The step of deactivating the cruise control system is postponed at least until the downhill speed control system is no longer active. Preferably, the system provides a notification to the operator via the operator interface in order to alert the driver that the cruise control system has been or will be deactivated.

Figure 6:
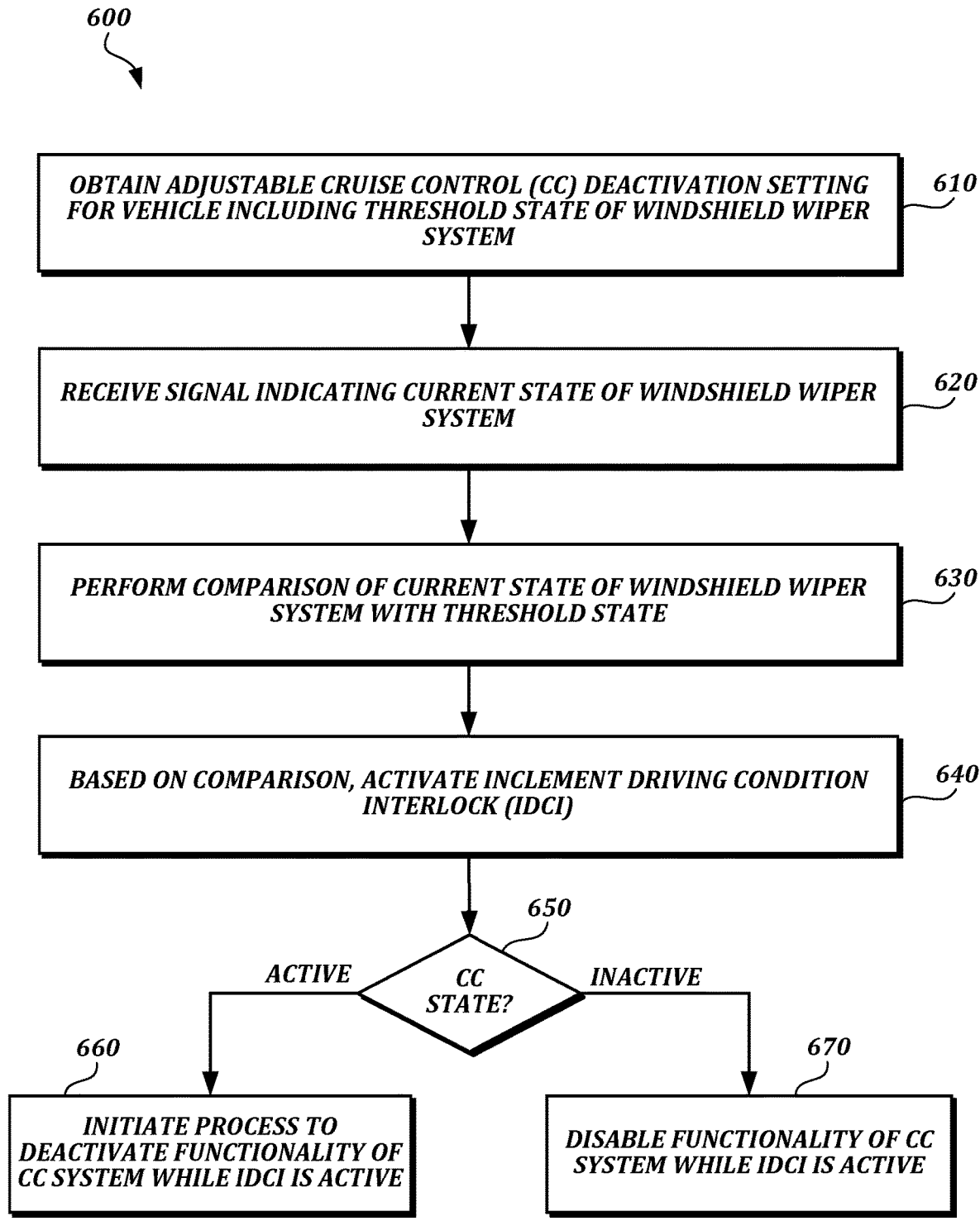

FIG. 6 is a flow diagram of another illustrative cruise control interlock method 600. In this example, an inclement driving condition function is activated based on the state of the windshield wiper system to help ensure that cruise control is inactive during inclement driving conditions, or that use of cruise control in such conditions is minimized. At step 610, the cruise control interlock system obtains one or more adjustable cruise control deactivation settings for the vehicle, including a threshold state of the windshield wiper system. Other possible settings include misuse prevention parameters, time delay periods, hysteresis time periods, and the like. These settings, including the threshold state, may be selected and subsequently adjusted by, e.g., the vehicle owner or fleet operator to account for factors such as operator preferences, prevailing driving conditions in a particular operation scenario or geographic area, etc. At step 620, the cruise control interlock system receives a signal indicating a current state of the windshield wiper system. At step 630, the cruise control interlock system performs a comparison of the current state with the threshold state. In an embodiment, the available states from which the threshold state and the current state are selected include an inactive state, one or more intermittent states, a low speed state, and a high speed state. At step 640, the cruise control interlock system activates an inclement driving condition interlock based at least in part on the comparison.

At step 650, the cruise control interlock system performs a check of the state of the cruise control system to determine if cruise control is currently active. If cruise control is active, at step 660 the cruise control interlock system initiates a process to deactivate functionality of the cruise control system (e.g., by canceling cruise control or disabling the ability of the operator to increment cruise control set speed) while the inclement driving condition interlock is active. This process may include postponing deactivation of the cruise control system until after expiration of a time delay period, which can help to avoid unnecessarily canceling cruise control where the wiper system is activated briefly, e.g., to clear debris from the windshield. This process also may include presenting a notification to the operator. This process also may include a vehicle de-rate process, such as reducing vehicle speed at a predetermined rate while the inclement driving condition function remains active. Where a downhill speed control function is active, this process also may include postponing deactivation of the cruise control system at least until the downhill speed control function is no longer active. If cruise control is inactive, at step 670 the cruise control interlock system disables cruise control functionality while the inclement driving condition interlock is active.

Extensions and Alternatives

Many alternatives to the described methods are possible. For example, processing stages in the various methods can be separated into additional stages or combined into fewer stages. Processing stages in the various methods also can be omitted or supplemented with other methods or processing stages. Furthermore, processing stages that are described as occurring in a particular order can instead occur in a different order and/or in a parallel fashion, with multiple components or software processes concurrently handling one or more of the illustrated processing stages. As another example, processing stages that are indicated as being performed by a particular device or module may instead be performed by one or more other devices or modules.

Many alternatives to the vehicles and systems described herein are possible. Although illustrative details of vehicle computing systems are described with reference to FIGS. 1, 2, and 3, it should be understood that alternative systems and methods can be implemented and used in accordance with the present disclosure. Further, it should be understood that, in practice, a fully-functional vehicle computer system may have additional components (e.g., sensors, control modules, output devices, input devices, and the like) that are not shown in FIGS. 1, 2, and 3 for ease of illustration.

The particular signals, variables, and parameters described herein, as well as their respective possible ranges and states and the particular logic for processing them, are only examples. Depending on implementation, more or fewer or different signals, variables, and parameters may be used to achieve similar results. In any of the examples described herein, the specific signals, variables, and parameters that are described can be separated into additional signals, variables, or parameters, or combined into fewer signals, variables, or parameters.

Many alternatives to the set of notifications described herein are possible. For example, notifications described herein can be omitted, supplemented with additional notifications, or replaced with different notifications or effects. As another example, elements described herein can be omitted, supplemented with additional elements, or replaced with different elements to provide, for example, different granularity of reminders (e.g., by making reminders more abrupt or more gradual, as may be desired in different situations).

It should be understood that aspects of the systems and related processes described herein transcend any particular type of vehicle and may be applied to vehicles employing an internal combustion engine (e.g., gas, diesel, etc.), hybrid drive train, or electric motor.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A method performed by a vehicle computer system of controlling a cruise control system of a vehicle, the method comprising, during operation of the vehicle:

obtaining an adjustable cruise control deactivation setting for the vehicle, wherein the adjustable cruise control deactivation setting includes a threshold state of a windshield wiper system of the vehicle, wherein the threshold state includes a threshold number of windshield wiper system activations within a misuse prevention time;

receiving a first signal indicating a current state of the windshield wiper system, wherein the current state includes a detected number of windshield wiper system activations within the misuse prevention time;

performing a comparison of the current state of the windshield wiper system with the threshold state, wherein performing the comparison comprises comparing the detected number of windshield wiper system activations to the threshold number of windshield wiper system activations; and based at least in part on the comparison, activating an inclement driving condition function, wherein the inclement driving condition function includes:
disabling a functionality of the cruise control system if the cruise control system is in an inactive state; and
initiating a process to deactivate the functionality of the cruise control system if the cruise control system is in an active state.

2. The method of claim 1, wherein the process to deactivate functionality of the cruise control system includes postponing deactivation of the cruise control system at least until expiration of a time delay period.

3. The method of claim 1 further comprising receiving a second signal indicating a downhill speed control system of the vehicle is active, wherein the process to deactivate functionality of the cruise control system includes postponing deactivation of the cruise control system at least until the downhill speed control system is no longer active.

4. The method of claim 1, wherein the process to deactivate functionality of the cruise control system includes a vehicle de-rate process.

5. The method of claim 4 wherein the vehicle de-rate process comprises reducing vehicle speed of the vehicle.

6. The method of claim 5 wherein reducing vehicle speed of the vehicle comprises periodically reducing vehicle speed by a predetermined amount while the inclement driving condition function remains active.

7. The method of claim 1, wherein the process to deactivate functionality of the cruise control system includes disabling cruise control set speed functionality while the inclement driving condition function remains active.

8. The method of claim 1, wherein the process to deactivate functionality of the cruise control system includes presenting a notification via an operator interface of the vehicle.

9. The method of claim 1, wherein the threshold state and the current state of the windshield wiper system each comprise a state selected from a group consisting of an inactive state, one or more intermittent states, a low speed state, and a high speed state.

10. A vehicle comprising:
a windshield wiper system;
a cruise control system;
an operator interface; and
an on-board vehicle computer system comprising at least one processing unit and a memory having stored therein computer-executable instructions configured to cause the on-board vehicle computer system to:
obtain an adjustable cruise control deactivation setting for the vehicle, wherein the adjustable cruise control deactivation setting includes a threshold state of a windshield wiper system of the vehicle, wherein the threshold state includes a threshold number of windshield wiper system activations within a misuse prevention time;
receive a first signal indicating a current state of the windshield wiper system, wherein the current state includes a detected number of windshield wiper system activations within the misuse prevention time;
perform a comparison of the current state of the windshield wiper system with the threshold state, wherein performing the comparison comprises comparing the detected number of windshield wiper system activations to the threshold number of windshield wiper system activations; and
based at least in part on the comparison, activate an inclement driving condition function, wherein the inclement driving condition function includes disabling a functionality of the cruise control system if the cruise control system is in an inactive state and initiating a process to deactivate the functionality of the cruise control system if the cruise control system is in an active state, wherein the process to deactivate the functionality of the cruise control system includes presenting a notification via the operator interface of the vehicle.

11. The vehicle of claim 10, wherein the process to deactivate functionality of the cruise control system includes postponing deactivation of the cruise control system until after expiration of a time delay period.

* * * * *